(12) United States Patent
Ho et al.

(10) Patent No.: US 11,628,998 B2
(45) Date of Patent: Apr. 18, 2023

(54) ULTRAVIOLET LIGHT INHIBITING CONTACT LENS PACKAGE

(71) Applicant: Johnson & Johnson Vision Care, Inc., Jacksonville, FL (US)

(72) Inventors: Thoi Ho, Longview, TX (US); Oleg Grishchenko, Jacksonville Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 149 days.

(21) Appl. No.: 16/219,145

(22) Filed: Dec. 13, 2018

(65) Prior Publication Data

US 2020/0189823 A1    Jun. 18, 2020

(51) Int. Cl.
| | | |
|---|---|---|
| *B65D 75/32* | (2006.01) | |
| *C08L 23/12* | (2006.01) | |
| *C08K 5/00* | (2006.01) | |
| *C08K 5/3475* | (2006.01) | |
| *C08K 5/20* | (2006.01) | |
| *C08K 5/09* | (2006.01) | |

(52) U.S. Cl.
CPC .......... *B65D 75/326* (2013.01); *C08K 5/0041* (2013.01); *C08K 5/0083* (2013.01); *C08K 5/09* (2013.01); *C08K 5/20* (2013.01); *C08K 5/3475* (2013.01); *C08L 23/12* (2013.01); *B65D 2575/3245* (2013.01); *B65D 2585/545* (2013.01); *Y10T 428/1352* (2015.01)

(58) Field of Classification Search
CPC ...... B65D 2575/3245; B65D 2585/545; B65D 75/326; B65D 85/38; C08K 5/0041; C08K 5/0083; C08K 5/09; C08K 5/3475; C08L 23/12; Y10T 428/1352; G02C 13/008; A61L 12/063
See application file for complete search history.

(56) References Cited

U.S. PATENT DOCUMENTS

| | | | |
|---|---|---|---|
| 6,066,374 A | 5/2000 | Healy et al. | |
| 8,420,190 B2 | 4/2013 | Fujita | |
| 8,420,197 B2 | 4/2013 | Giraud et al. | |
| 9,723,903 B2* | 8/2017 | Barre | B65D 85/00 |
| 10,578,890 B1* | 3/2020 | Cheslock | A45C 11/005 |
| 2005/0047991 A1 | 3/2005 | Rees et al. | |
| 2005/0047999 A1 | 3/2005 | Rees et al. | |
| 2009/0078669 A1 | 3/2009 | Sakaguchi | |
| 2010/0204523 A1 | 8/2010 | Tominaga et al. | |

FOREIGN PATENT DOCUMENTS

| | | | |
|---|---|---|---|
| CN | 104220531 | * | 8/2018 |
| EP | 1930243 | | 6/2008 |
| EP | 2537868 | | 12/2012 |
| WO | WO2012017984 | | 2/2012 |

OTHER PUBLICATIONS

PCT Search Report PCT/IB2019/060672 dated Feb. 25, 2020.

* cited by examiner

*Primary Examiner* — Yan Lan

(57) ABSTRACT

A package for contact lenses package having an ability to block ultraviolet and high energy visible wavelengths. The package has a transmissibility of less than 20% at wavelengths between 250 nm and 475 nm, and a transmissibility equal to or greater than 10% at the light wavelengths greater than 480 nm.

9 Claims, 4 Drawing Sheets

ULTRAVIOLET LIGHT INHIBITING CONTACT LENS PACKAGE

BACKGROUND OF THE INVENTION

The present invention relates to packages used by consumers of contact lenses. More specifically, the present package helps inhibit the uptake of ultraviolet light into the package, and fatigue in materials due to exposure to light. This attribute will be useful for packaging contact lenses that contain a drug which elutes from the lens. It is perceived that exposure of ultraviolet light to the lens may cause the drug's efficacy to be compromised, not as a danger to the user, but for its therapeutic effect.

DETAILED DESCRIPTION OF THE INVENTION

Figure 1:
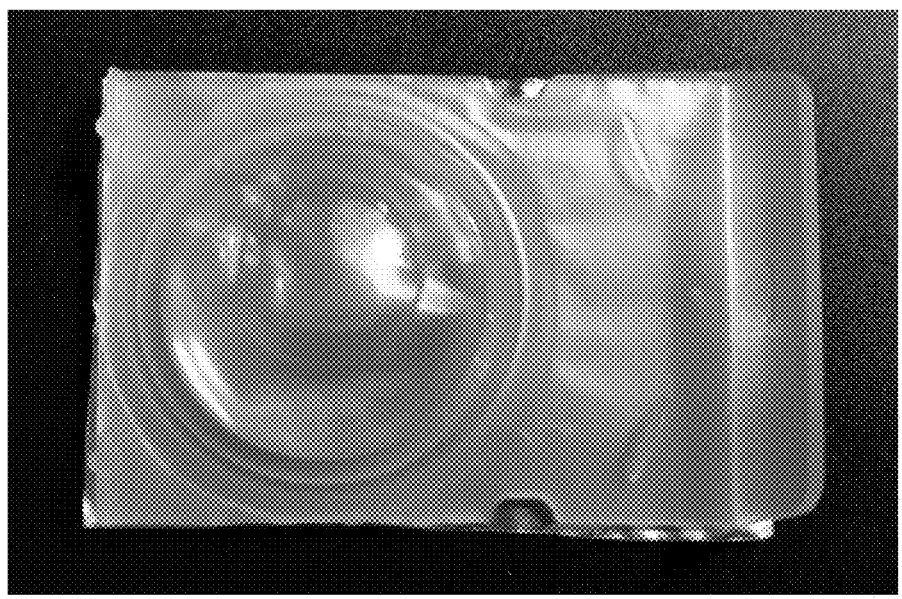
FIG. 1 is an underside view of a contact lens package with a contact lens placed in it. The package is made according to the description of the invention contained herein.

A light managing resin formulation has been developed for protection of light sensitive contact lens from exposure to radiation (i.e., ultraviolet light) during lens storage, handling, and distribution to the point of final use. A package fabricated from this resin should provide protection from natural and artificial light having wavelengths in a range between 200 nm to 470 nm. In this wavelength range, the resin offers effective protection from high energy doses of ultraviolet radiation.

The unique attribute of this material is the selective blocking or transmitting of light in the defined wavelength region. It effectively blocks light in the region from 200 nm to 470 nm and allows high level of light transition for wavelengths above 500 nm. It is important that both attributes are present in the package, as this prevents deterioration of the drug contained in the lens, while continuing to allow the lens to be seen, either via automated visual mechanisms or by the naked eye. When able to be seen above 500 nm, the lens can be inspected for quality control as well as ultimately, removed by the user for placement on the eye. This selective light transmittance combined with optical clarity provides protective screening from the ultraviolet light in the selected range, while at the same time allowing the use of photovoltaic cells and cameras for automatic lens inspection through the package itself, using monochromatic red light.

The light managing resin formulation was achieved with the use of a polypropylene base and additive to the package, that included an ultraviolet (UV) blocker/reflector, a nucleator/clarifier and a color dye.

Formulation work began with blending homopolymer polypropylene with UV blocking additives. Several additives were evaluated and a broad range UV phenolic blocker/reflector: phenol, 2-(5-chloro-2H-benzotriazol-2-yl)-6-(1,1-dimethylethyl)-4-methyl, was selected. This additive has the additional benefit of possessing a low migration rate through polypropylene. Therefore, it is unlikely to leach out from the polypropylene, and thereby interfere with the drug in the packing solution, situated in the package in which the contact lens is placed (in order to maintain drug in the lens while keeping it moist) or on the other hand, to get extracted from it.

It was determined that for adequate blocking, the concentration of the chosen phenolic UV blocker must be approximately 0.25% by weight. Of course, depending on the blocker, other concentrations are possible. At this concentration, the UV blocker effectively blocked radiation wavelengths in the range of about 200 nm to about 350 nm. However, the use of this blocker/reflector with polypropylene alone causes the resulting plastic to become hazy. This makes the package difficult to quality control using through-the-blister photography. Also, high energy visible radiation (wavelengths in the range of about 350 nm to about 450 nm) would still penetrate the primary package and effect the sealed product.

The two aforementioned parameters were addressed using two separate chemical approaches. First, we added a clarifier/nucleating agent, to reduce any haze and to make the blister transparent to monochromatic photography. Second, we added a yellow/orange color dye. The color dye blocked visible light in wavelengths from the region from about 350 nm to about 450 nm.

Two different dyes were employed in the formulations. One formulation contained color dye GC17 cas #519050-54-5, made by DayGlo Corporation [Cleveland, Ohio] The second dye used in formulation contained ClearTint 7364, a proprietary colorant supplied by Milliken Co. [Spartanburg, S.C.]. Of course, it is envisioned that other dyes may also serve to block out light in the prescribed wavelengths.

Both resin formulations (i.e., with the DayGlo dye or with the Milliken dye) resulted in a polypropylene resin that was yellow and clear in appearance, had a low dye leach rate discussed above, as well as a low likelihood of drug extraction. The package bowl thus made also provided adequate protection to the contact lens product sealed inside the package.

Figure 2:
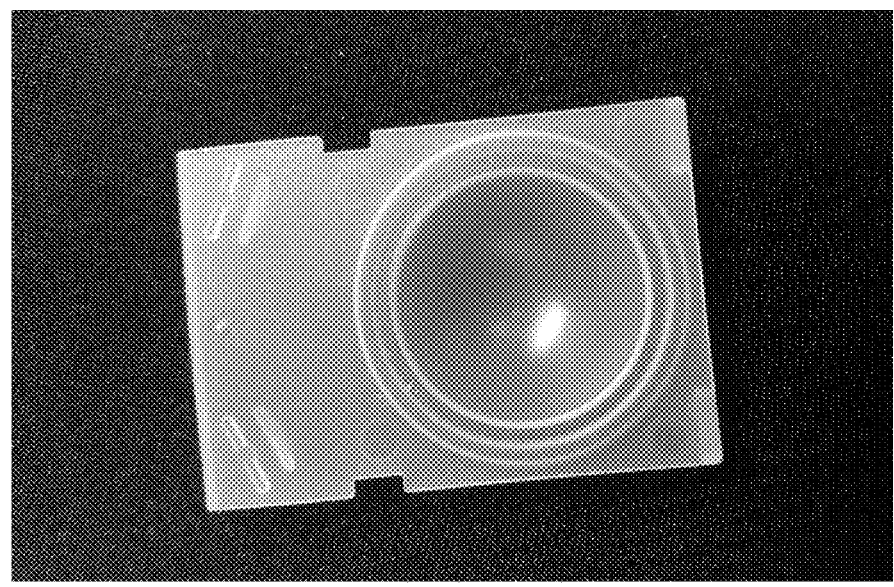
FIG. 2 is a top view of an unfilled lens package of the present invention, without attachment to a sealing lid or having a contact lens placed therein.

As seen in FIGS. 1 and 2, there is contained a package 10, containing a bowl 20 and a cover 30. The bowl is formulated according to the description of this invention. The package 10 has a cover 30 made from polymeric and aluminum foil film adhered to it. The bowl 20 has a contact lens 40 seated in it. The lens 40 is placed in a solution for storage and to maintain the lens 40 in a moistened state during storage. The solution is generally saline, but in the case of this invention also contains a drug.

One of the useful drugs for therapeutic purposes for use with contact lenses is the drug ketotifen. The solution is intended to be of such a molarity that drug will elute into the contact lens at therapeutically useful rates.

The light managing resin of this invention, to be used in conjunction with the bowl 20 of FIG. 1, was formulated using conventional methods with:

a) polypropylene base resin consisting of 99% polypropylene homopolymer cas #9003-07-0 with stabilizer, acid acceptor and melt stabilizer b) at least one ultraviolet absorber/reflector Phenol, 2-(5-chloro-2H-benzotriazol-2-yl)-6-(1,1-dimethylethyl)-4-methyl, cas #3896-11-5 c) at least one-color dye chosen from Milliken ClearTint 7364 or DayGlo cas #519050-54-5; and d) at least one nucleator/clarifier.

The formulated resin has the following properties and test values within the following specified ranges:

Melt Flow Rate range—20 to 40 g/10 minimum per ASTM Test D 1238

Density—0.90 g/cm3 ASTM D 1505

Melting Temperature Range—120° C. to 165° C. ASTM D 3418

Deflection Temperature@66 psi—range 105° C. to 120° C. ASTM D 648

Note: ASTM test D 1238, D 1505, D 3418, D 648 are standard test defined by the American Society for Testing and Materials (ASTM)

The concentration of additives is optimized for the thickness of the polypropylene package bowl 20 protecting the contact lens 30. The thickness of the bowl was in the range of about 0.5 nm to 1.0 mm.

Particularly preferred embodiments of the present invention contain components of the bowl 20 in the following concentrations by weight:

a) base polypropylene resin: ≥99% CAS 9003-07-0 b) ultraviolet absorber(s)/reflector(s): <0.3% Phenol, 2-(5-chloro-2H-benzotriazol-2-yl)-6-(1,1-dimethylethyl)-4-methyl, CAS 3896-11-5 c) color dye: <0.3% 1,4-Cyclohexanedicarboxylic acid, polymer with 1,4-cyclohexanedimethanol,2-(3-hydroxypropyl)-6-[(3-hydroxylpropyl) aniino]-1Hbenz[de]isoquinoline-1,3-(2H)-dione and 1,3-pentanediamine, 2-hydroxy-3-phenoxypropyl ester, CAS 519050-54-5 d) nucleator/clarifier: between 0.01-0.3% of the following nucleators or clarifiers:

sorbitol based clarifiers, such as:

3,4 methylbenzylene sorbitol (CAS 135861-56-2);

1-[8-propyl-2,6-bis(4-propylphenyl)-4,4a,8,8a-tetrahydro-[1,3] dioxino [5,4-d] [1,3] dioxin-4-yl]ethane-1,2-diol (CAS 882073-43-0);

N-[3,5-Bis-(2,2-dimethyl-propionylamino)-phenyl]-2,2-dimethyl-propionamide, CAS 745070-61-5;

Calcium cis-1,2-cyclohexanedicarboxylate (CAS 491589-22-1);

Sodium bis(2,2-methylene-bis(4,6-DI-tert-butylphenyl) phosphate) (CAS 85209-91-2: and aluminium hydroxybis [2,2'-methylen-bis(4,6-di-tert-butylphenyl)phosphate] (CAS 151841-65-5)

In another embodiment, component (c), the color dye, CAS 519050-54-5 was successfully substituted with another dye-Milliken ClearTint 7364 yellow MB, used at concentration <10%

Figure 5:
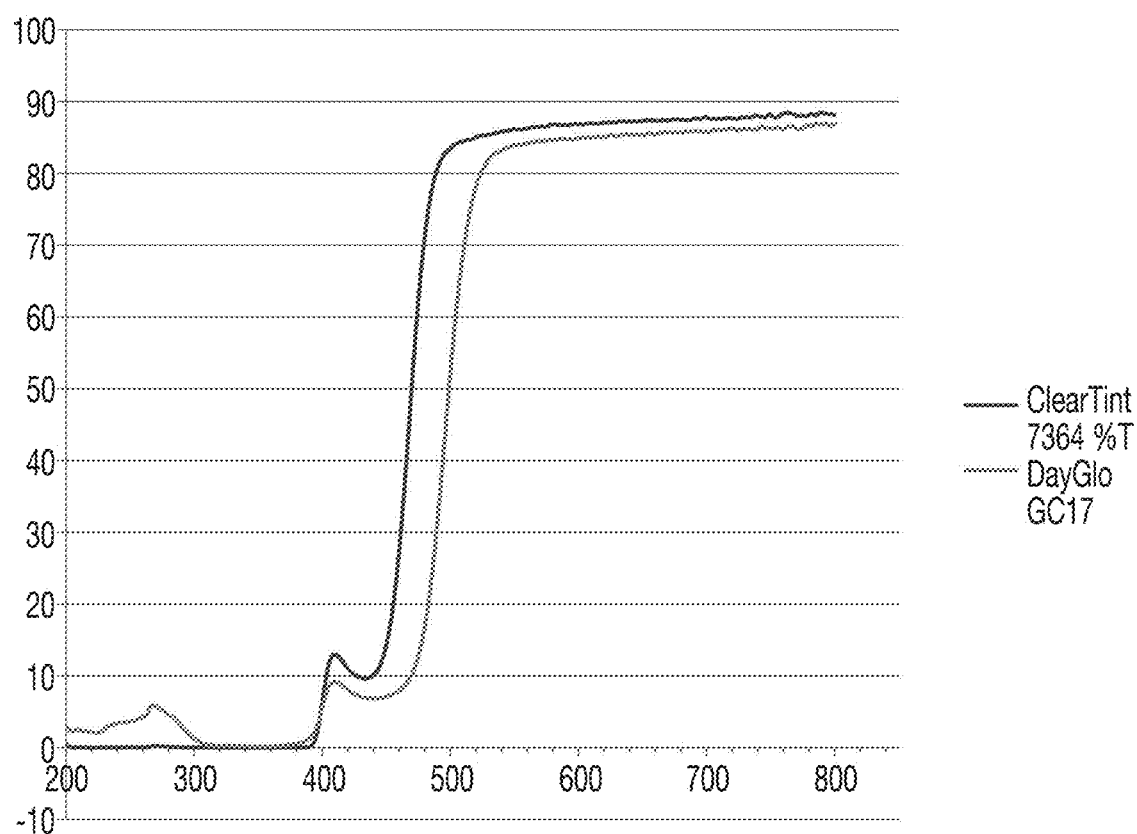
FIG. 5 is a table of typical UV vision percentage profiles of yellow blisters.
Figure 6:
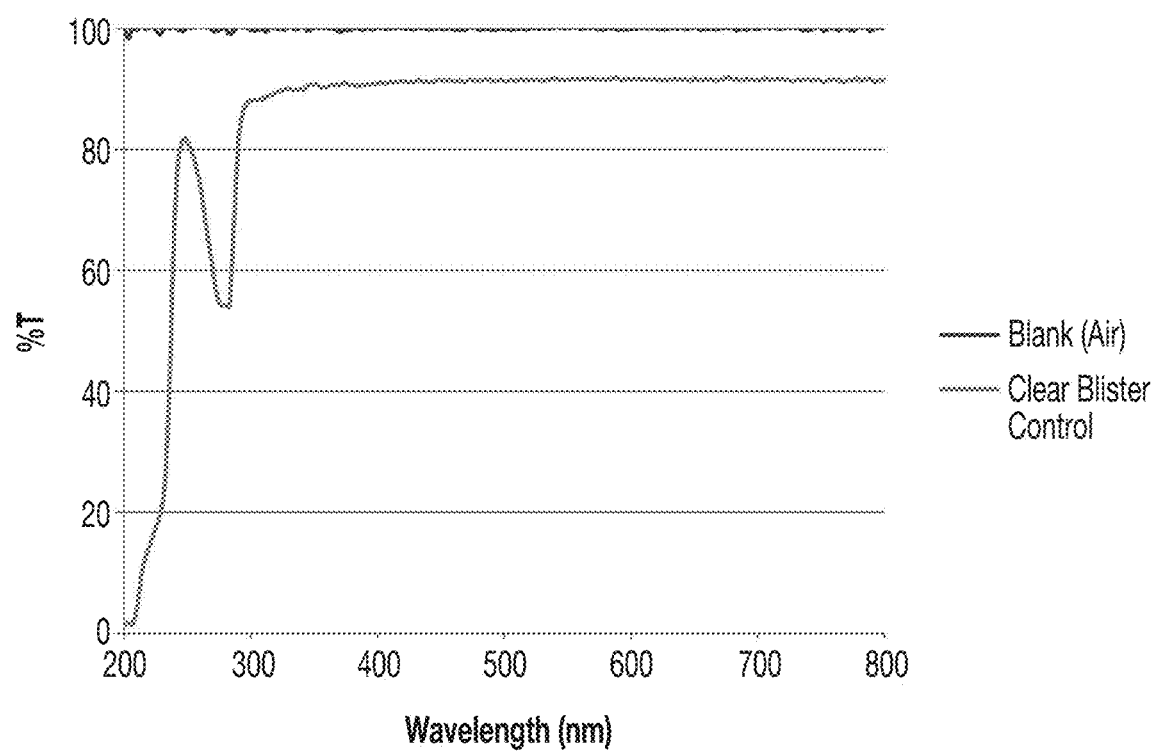
FIG. 6 is a table of typical UV vision percentage profiles of clear blisters.

The above described resin formulations produced transmission profile depicted in FIGS. 5 and 6.

The characteristic and essential aspect of this transmission profile is a nearly vertical rise in the transmission curve in the range of about 450 nm to the 500 nm region to a level above 80% light transmission as in FIG. 5. What this means is that ideally, the light is not transmitted through the package at wavelengths below about 450 nm, or at most 470 nm, and then above about 480 nm, light is fully visible. Conversely, at lower wavelengths, light is to be blocked from at least 200 nm and higher wavelengths, as is seen in the "left tail" of the graph of FIG. 6.

Figure 3:
FIG. 3 is an underside perspective view of an alternate embodiment dual material blister, containing a clear drug-inert inner layer (to be place in contact with a contact lens contained in solution) and a light protective layer on the outer surface of the bowl.
Figure 4:
FIG. 4 is a perspective view of an alternate embodiment of the package of FIG. 3.

It is also perceived that the package of the present invention could be made with an alternate configuration, such as that seen in FIGS. 3 and 4. There we see a two-part package which accomplishes the same effect. The interior or lens-contacting surface 200 of the package 100 is formed from a clear polymer, such as polypropylene. (Of course, alternate materials such as COP and COC polymers may be used, as long as they are also configured to block UV light.) This arrangement is made so that there is no contact between the light blocking surface and the lens. Thereafter, the bowl 300 is placed at a point outer of the frame, so as to still adequately block UV light.

The bowl 300 and the lens-contacting frame 200 are interference fit or sonically welded to one another (or both) to ensure that they do not separate with typical handling.

Or, yet another modification can be made, as seen in FIG. 4. With this package, there is no concern about contact between the light blocking bowl 400 and contact lenses. Then, the frame 500 can be placed to the outside of the bowl 400. As in FIG. 4, there is seen a clear frame 500. However, by placing the bowl on the inside, the type of frame 500 can vary in color. For instance, "regular" contact lenses might be placed in a package with a clear frame 500, while toric lenses might be used in a blue package, and presbyopia lenses in a green package.

A comparison of the two packages demonstrates the effectiveness of the present invention. As a control, a package with a clear blister (as in FIG. 6) containing a light sensitive lens was placed in sunlight. The lenses in these packages darkened in the package immediately. In contrast, a package with a yellow blister of as in Table 1 prevented a light sensitive lens from darkening even when exposed to sunlight for one hour.

Similar accommodations could be made for beauty lenses, etc. In such an embodiment, the package bowl and attached flange are addressed differently. The bowl is made of any material required for sterility and shelf-life, whereas the flange is treated as an identification tool, and is customized to address brand/product recognition or anti-counterfeiting needs. For instance, the color used in the dye to create the flange may be configured as a complementing color to the lens contained inside. Such an arrangement would be useful for "beauty" type lenses which produce a perceived iris color of the user, which is useful for the younger demographic targeted by this product. One could potentially have every product using a different color package. Or, with the right equipment, one could have random colored packages within the same carton of one product. Any color flange in the color-wheel is possible, also including sparkles, pearlescents, marbling or swirls, etc.

The foregoing invention is to be understood in conjunction with the appended claims, taking into account all appropriate equivalents.

What is claimed is:

1. A package containing:

a bulb with a cover adhesively attached thereto, and a contact lens contained in solution between said cover and said bulb;

wherein the bulb of said package is comprised of a formulation having an ability to block ultraviolet and high energy visible wavelengths, said bulb having a transmissibility of less than 20% at wavelengths between 250 nm and about 470 nm, and a transmissibility equal to or greater than 80% at the light wavelengths greater than 480 nm; and said bulb containing as an ultraviolet blocker, Phenol, 2-(5-chloro-2H-benzotriazol-2-yl)-6-(1,1-dimethylethyl)-4-methyl.

2. The package of claim 1, wherein said bulb is comprised of polypropylene, and a dye blended with said polypropylene.

3. The package of claim 2 wherein said bulb further comprises a mixture of said dye, and said ultraviolet blocker blended with said polypropylene.

4. The package of claim 3 further comprising a nucleator blended therein.

5. The package of claim 2, 3 or 4 where the dye is 1,4-Cyclohexanedicarboxylic acid, polymer with 1,4-cyclohexanedirnethanol, 2-(3-hydroxypropyl)-6-[(3-hydroxylpropyl) aniino]-1H benz[de]isoquinoline-1,3-(2H)-dione and 1,3-pentanediamine, 2-hydroxy-3-phenoxypropyl ester.

6. The package of claim 4 where the nucleator is N-[3,5-Bis-(2,2-dimethyl-propionylamino)-phenyl]-2,2-dimethyl-propionannide.

7. The package of claim 4 where the nucleator is 1-[8-propyl-2,6-bis(4- propylphenyl)-4,4a,8,8a-tetrahydro-[1,3] dioxino [5,4-d] [1,3] dioxin-4-yl]ethane-1,2-diol.

8. The package of claim 4 where the nucleator is sodium bis(2,2-methylene-bis(4,6-DI-tert-butyl phenyl)phosphate).

9. A package for contact lenses, said package comprising:
a bulb with a lid adhesively sealed thereon, and a contact lens held in solution between said cover and said bulb;
and said bulb comprised of:
polypropylene; 1,4-Cyclohexanedicarboxylic acid, polymer with 1,4-cyclohexanedirnethanol,2-(3-hydroxypropyl)-6-[(3-hydroxylpropyl) aniino]-1Hbenz[de]isoquinoline-1,3-(2H)-dione and 1,3-pentanediamine, 2-hydroxy-3- phenoxypropyl ester; Phenol, 2-(5-chloro-2H-benzotriazol-2-yl)-6-(1,1-dimethylethyl)-4-methyl; and N-[3,5-Bis-(2,2-dimethyl-propionylamino)-phenyl]-2,2-dimethyl-propionamide; and
wherein said bulb has a transmissibility equal to or greater than 80% at light wavelengths greater than 480 nm.

* * * * *